United States Patent
Susa et al.

(10) Patent No.: US 7,921,677 B2
(45) Date of Patent: Apr. 12, 2011

(54) VEHICULAR UPHOLSTERY POLYPROPYLENETEREPHTHALATE FIBER FABRIC AND METHOD FOR PRODUCING OF FABRIC

(75) Inventors: Daisuke Susa, Wako (JP); Hidehito Fukumoto, Wako (JP); Kazuki Kitagawa, Ritto (JP); Tomohiro Nagao, Moriyama (JP)

(73) Assignees: Honda Motor Co., Ltd., Tokyo (JP); TB Kawashima Co., Ltd., Aichi (JP)

( * ) Notice: Subject to any disclaimer, the term of this patent is extended or adjusted under 35 U.S.C. 154(b) by 111 days.

(21) Appl. No.: 12/295,018

(22) PCT Filed: May 9, 2007

(86) PCT No.: PCT/JP2007/059996

§ 371 (c)(1),
(2), (4) Date: Jun. 25, 2009

(87) PCT Pub. No.: WO2007/132869

PCT Pub. Date: Nov. 22, 2007

(65) Prior Publication Data

US 2010/0037658 A1   Feb. 18, 2010

(30) Foreign Application Priority Data

May 15, 2006 (JP) ................................. 2006-134698

(51) Int. Cl.
D04B 1/22 (2006.01)

(52) U.S. Cl. ............................... 66/170; 66/194; 66/191

(58) Field of Classification Search ................... 66/191, 66/192, 193, 194, 195, 202, 170
See application file for complete search history.

(56) References Cited

U.S. PATENT DOCUMENTS

| 5,428,969 | A * | 7/1995 | Day et al. ........................ 66/202 |
| 5,440,902 | A * | 8/1995 | Wieland et al. .................. 66/194 |
| 7,021,085 | B2 * | 4/2006 | Ikeda et al. ..................... 66/191 |
| 7,201,024 | B2 * | 4/2007 | Hirayama et al. .............. 66/192 |
| 2003/0094019 | A1 | 5/2003 | Miyake et al. |
| 2006/0059954 | A1 | 3/2006 | Hirayama et al. |

FOREIGN PATENT DOCUMENTS

| JP | 11-093050 A | 4/1999 |
| JP | 2000-154457 A | 6/2000 |
| JP | 2002-004156 A | 1/2002 |
| JP | 2002-129451 A | 5/2002 |
| JP | 2005-113279 A | 4/2005 |
| WO | 03/004747 A1 | 1/2003 |
| WO | 2004/022827 A1 | 3/2004 |

* cited by examiner

*Primary Examiner* — Danny Worrell
(74) *Attorney, Agent, or Firm* — Leason Ellis LLP.

(57) ABSTRACT

A vehicular upholstery fabric is made from a raw tricot fabric which is knitted by using a PPT-multifilament yarn whose single fiber fineness is about 0.5~6.0 dtex and whose total fineness is about 30~180 dtex for the ground yarn and the pile yarn. The raw tricot fabric has been transformed into a napped tricot pile fabric by raising the sinker loop of the pile yarn of the raw tricot fabric to form fluffs which are then sheared to form cut piles. A PPT-bulky multifilament yarn is used for the ground yarn. A PPT-non-bulky texturized multifilament yarn or a PPT-bulky texturized multifilament yarn is used for the pile yarn.

7 Claims, 1 Drawing Sheet

VEHICULAR UPHOLSTERY POLYPROPYLENETEREPHTHALATE FIBER FABRIC AND METHOD FOR PRODUCING OF FABRIC

CROSS-REFERENCE TO PRIOR APPLICATION

This is the U.S. National Phase Application under 35 U.S.C. §371 of International Patent Application No. PCT/JP2007/059996 filed May 9, 2007, which claims the benefit of Japanese Patent Application No. 2006-134698 filed May 15, 2006, both of them are incorporated by reference herein. The International Application was published in Japanese on Nov. 22, 2007 as WO 2007/132869 a1 under pct article 21(2).

BACKGROUND OF THE INVENTION

1. Field of the Invention

The present invention relates to a napped tricot pile fabric used for a vehicular upholstery which is knitted by applying a polypropyleneterephthalate fiber multifilament yarn to a ground yarn and a pile yarn and is finished by raising a sinker loop and by shearing napped fluffs to form a cut pile.

In the napped tricot pile fabric used for the vehicular upholstery, a polyethyleneterephthalate fiber multifilament yarn whose single fiber fineness is about 0.5~6.0 dtex and whose total fineness is about 30~180 dtex is applied generally to the ground yarn and the pile yarn. The density of the wale of the cut pile is more than about 30 W/25.4 mm. The density of the course of the cut pile is more than about 50 C/25.4 mm. The density of knit loop, which is defined by the product of the density of the wale of the cut pile and the density of the course of the cut pile, is about 1800~2300 C×W/(25.4 mm)$^2$.

2. Description of the Related Art

For preservation of natural resources and the global environment, renewable natural fibers such as cotton, linen, silk, wool, and the like are preferably used, because these fibers do not depend on non-renewable petroleum resources.

In this regard, a polypropyleneterephthalate fiber, called "PPT-fiber", and a polylacticacid fiber are synthetic fibers that can be produced from natural plant fibers rather than from petroleum.

Japanese Patent Laid Open No. 2000-154457, Japanese Patent Laid Open No. 2002-004156, Japanese Patent Laid Open No. 2005-113279, and Japanese Patent Laid Open No. HEI-11-093050 disclose the PPT-fiber and the polylacticacid fiber that can be used for a vehicular upholstery fabric.

Since the vehicular upholstery fabric is used under severe conditions, a polyethyleneterephthalate fiber, called "PET-fiber", is mainly used for the vehicular upholstery fabric. Natural fibers and rayon lack the durability of PET-fiber; thus, natural fibers and rayon are not desirably used for vehicular upholstery fabric.

In this regard, PPT-fibers and polylacticacid fibers are relatively new materials used for the vehicular upholstery fabric, since the chemical formula of polypropyleneterephthalate, known as "PPT", and polylacticacid are similar to the chemical formulas of polyethyleneterephthalate, known as "PET". However, polylacticacid fiber lacks corrosion resistance since it is a type of biodegradable fiber. Further, polylacticacid fiber lacks in the ability to absorb dyes.

Therefore, in the case of the application of polylacticacid fiber for use as a vehicular upholstery fabric, it must be chemically treated.

In this regard, in comparison with PET-fiber, the Young's Modulus of PPT-fiber is lower, the rate of elastic recovery of PPT-fiber is higher, and PPT-fiber is rich in flexibility and stretching property.

Thus, it is expected that vehicular upholstery fabric having an agreeable texture will be obtained by using PPT-fiber rather than PET-fiber.

However, when a napped tricot pile fabric is knitted from PPT-multifilament yarn rather than from PET-multifilament yarn, the cut-off-end-portion (where the fabric is cut off), does not remain straight but instead curls very easily.

Therefore, at the time of cutting and stacking of the napped tricot pile fabrics knitted from PPT-multifilament yarn, the curling of the cut-off-end-portion hinders the ability to stack the cut tricot pile fabrics by arranging the cut-off-end-portions in order. Further, at the time of sewing the cut tricot pile fabrics, in order to avoid the aforementioned curling problem, the cut-off-end-portion should be under tension by pulling from one side to the other side, or should be pushed down to prevent the cut-off-end-portion from curling. As a result, it takes a lot of time and labor to sew the cut tricot pile fabrics, and the tendency of the cut-off-end-portion to curl gives rise to inaccurate sewing which results in fabrics unusable for vehicle upholstery.

Therefore, using napped tricot pile fabric knitted from PPT-multifilament yarn (rather than from PET-multifilament yarn) for in vehicular upholstery has generally been avoided.

The cut-off-end-portion of the cut tricot pile fabric in which PPT-fibers had been used for the ground yarn and the pile yarn was minutely observed with regard to curling. Specifically, the following was observed:

(1) curling did not occur at the cut-off-end-portion where the napped tricot pile fabric is cut along the knitting length direction; but rather (2) curling did occur at the cut-off-end-portion where the napped tricot pile fabric is cut along the knitting width direction crossing the knitting length direction. When PPT-multifilament yarn (rather than PET-multifilament yarn) is used to knit napped tricot pile fabric, the following should initially be considered:

(1) the needle loop and the sinker loop are formed by looping the ground yarn and the pile yarn in the knitting width direction;

(2) the ground yarn and the pile yarn in the napped tricot pile fabric are continuous in the knitting length direction:

(3) PPT-fiber is superior in stretching property (that is, the rate of elastic recovery) in comparison with PET-fiber which is conventionally used for the vehicular upholstery fabric;

(4) in comparison with PET-fiber, PPT-fiber shrinks more easily when heated;

(5) therefore, the shrinking stress caused from heating and corresponding with the tension which acts on the raw tricot fabric made from PPT-fiber during the knitting process is greater than that which acts on the raw tricot fabric made from PET-fiber during the knitting process;

(6) similarly, the heat shrinking stress which occurs and acts on the raw tricot fabric made from PPT-fiber during the dyeing and finishing process is greater than that which occurs and acts on the raw tricot fabric made from PET-fiber during the dyeing and finishing process;

(7) as a result, the potential stress which is stored up in PPT-fiber during the knitting and dyeing and finishing processes is realized as a shrinking stress for giving which gives rise to the curling in the knitting length direction, when the ground yarn and the pile yarn are extended during the cutting and sewing process and where tensile stress (tension) does not act on the fabric.

On further investigation, when PPT-multifilament yarn rather than PET-multifilament yarn is used to create napped tricot pile fabric, the following should be considered:

(1) the needle loop does not form a lanky-shape configuration elongated in the knitting length direction but instead forms a loop-like-shape configuration puffed in the knitting width direction, and even though the ground yarn and the pile yarn tend to shrink due to the potential stress stored in those fibers, the needle loop only turns into a loop-like-shape configuration as opposed to the usual lanky-shape configuration.

(2) the course intervals which are the size of a needle loop in the knitting length direction, hardly shorten;

(3) when the ground yarn and the pile yarn shrink, shrinkability of the napped tricot pile fabric in the knitting length direction is counteracted in accordance with the shrinking of the ground yarn (11) and the pile yarn (12); and (4) as a result, the napped tricot pile fabric hardly curls in the knitting length direction.

On further investigation, when PPT-multifilament yarn rather than PET-multifilament yarn is used to create napped tricot pile fabric, the following should also be considered:

(1) when PPT-fiber used for the ground yarn is a bulky-texturized fiber which is bent finely and tortuously and has crimps, even though the PPT-fiber shrinks from the potential stress stored in it, only the crimps disappear and then the PPT-fiber is brought back to its original non-bulky texturized situation;

(2) then, if the crimps only disappear at the time PPT-bulky texturized fiber shrinks, then the course intervals hardly shorten;

(3) further, if the crimps only disappear at the time PPT-bulky texturized fiber shrinks, shrinkability of the napped tricot pile fabric in the knitting length direction is counteracted upon the shrinking of the ground yarn and the pile yarn;

(4) as a result, the napped tricot pile fabric hardly curls in the knitting length direction.

Upon additional investigation, when PPT-multifilament yarn rather than PET-multifilament yarn is used to create the napped tricot pile fabric, the following should also be considered:

(1) when the PPT-fiber is not made of only PPT (polypropyleneterephthalate), but instead is made of a combination of PPT and PET, polyethylentenephythalate (poly-ethleneterephth, which has a Young's Modulus higher than that of PPT and for which the rate of elastic recovery, flexibility and stretching property are lower than those of PPT), the potential stress of this PPT-PET conjugate fiber decreases in accordance with PET-component.

(2) therefore, in the case with this PPT-PET conjugate fiber, even though potential stress is stored within its fibers, the shrinking stress resulting from the potential stress is comparatively less (than with pure PPT fibers);

(3) as a result, the napped tricot pile fabric hardly curls in the knitting length direction even though the potential stress stored in the PPT-PET conjugate fiber is realized.

Upon further investigation, when PPT-multifilament yarn, rather than PET-multifilament yarn, is used to create the napped tricot pile fabric, the following should also be considered:

(1) when the pile yarn is a twist yarn, a strong raking stress is required during the raising process since the yarn is twisted and thus it is difficult to rake out the fibers of the pile yarn.

(2) during the raking process, a strong raking stress propagates from the sinker loop to the needle loop; that strong raking stress acts upon the pile yarn as a tensile stress;

(3) the tensile stress makes the needle loop strained in the knitting length direction, and the course intervals become shortened;

(4) the substantial length of the portion of the ground yarn of the needle loop thus becomes elongated compared to the substantial length of the portion of the pile yarn of the needle loop;

(5) accordingly the ground yarn becomes loose as a result of this elongation;

(6) thus, when the potential stress in the ground yarn is realized, the loosened portions of the ground yarn only recover their original form and original length:

(7) put another way, the course intervals shortened by the tensile stress which acts on the pile yarn during raising process are not shortened further by the potential stress which is realized in the ground yarn after the raising process; and (8) as a result, even though the potential stress stored in the ground yarn is realized as a shrinking stress, shrinking caused by the shrinking stress in the knitting length direction of the napped tricot pile fabric is nonetheless counteracted, and, consequently, the napped tricot pile fabric hardly curls in the knitting length direction.

SUMMARY OF THE INVENTION

The present invention resulted in part from the knowledge obtained by the foregoing investigations. In particular, in accordance with the present invention, the vehicular upholstery PPT-fiber fabric is produced by the following steps:

A raw tricot fabric is knitted by using a PPT-multifilament yarn, whose single fiber fineness is about 0.5~6.0 dtex and whose total fineness is about 30~180 dtex, for the ground yarn (11) and the pile yarn (12);

the sinker loop (13) of the pile yarn of the raw tricot fabric is napped to form fluffs;

the raw tricot fabric is transformed into a napped tricot pile fabric by shearing the napped fluffs to form cut piles;

the napped tricot pile fabric is spread neatly;

the spread napped tricot pile fabric is heated by straining in the knitting width direction (C) only, without straining in the knitting length direction (W), thereby relieving a potential stress of the needle loop (14) of the ground yarn (11) stored during the knitting process, in that the density of the wale of the cut pile is more than about 30 W/25.4 mm, the density of the course of the cut pile is more than about 50 C/25.4 mm, and the density of the knit loop, which is defined by the product of the density of the wale of the cut pile and the density of the course of the cut pile, is about from 1800 to 2300 C×W/(25.4 mm)$^2$.

DESCRIPTION OF THE PREFERRED EMBODIMENTS

Figure 1:
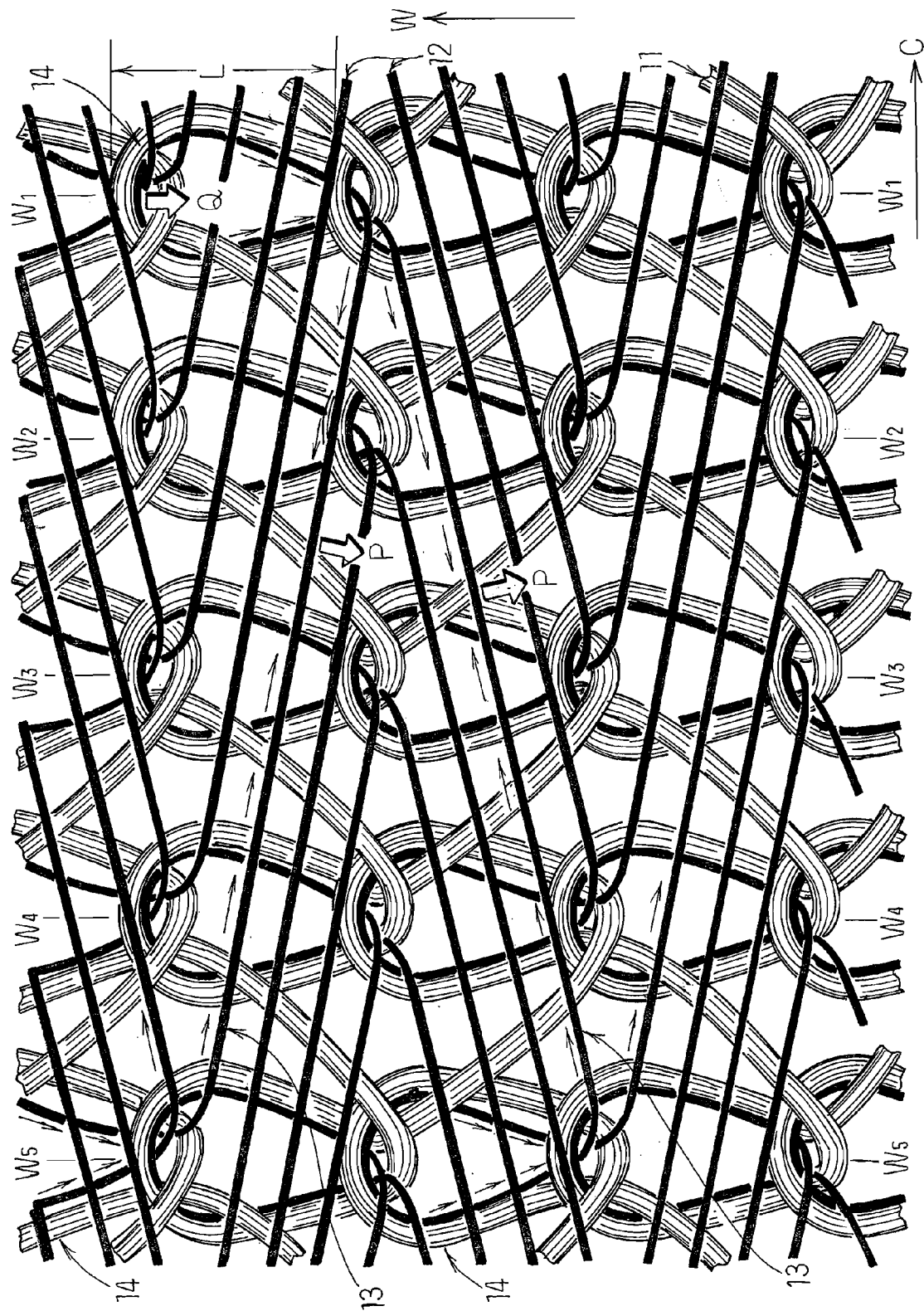
FIG. 1 shows a plain view of the raw tricot fabric.

The present invention resulted in part from the knowledge obtained by the foregoing investigations. In particular, in accordance with the present invention, the vehicular upholstery PPT-fiber fabric is produced by the following steps:

A raw tricot fabric is knitted by using a PPT-multifilament yarn, whose single fiber fineness is about 0.5~6.0 dtex and whose total fineness is about 30~180 dtex, for the ground yarn (11) and the pile yarn (12);

the sinker loop (13) of the pile yarn of the raw tricot fabric is napped to form fluffs;

the raw tricot fabric is transformed into a napped tricot pile fabric by shearing the napped fluffs to form cut piles;

the napped tricot pile fabric is spread neatly;

the spread napped tricot pile fabric is heated by straining in the knitting width direction (C) only, without straining in the knitting length direction (W), thereby relieving a potential stress of the needle loop (14) of the ground yarn (11) stored during the knitting process, in that the density of the wale of the cut pile is more than about 30 W/25.4 mm, the density of the course of the cut pile is more than about 50 C/25.4 mm, and the density of the knit loop, which is defined by the product of the density of the wale of the cut pile and the density of the course of the cut pile, is about from 1800 to 2300 C×W/(25.4 mm)$^2$.

The vehicular upholstery PPT-fiber fabric of the present invention has the raw tricot fabric knitted by using a PPT-multifilament yarn for the ground yarn (11) and the pile yarn (12), the raw tricot fabric is then transformed into a napped tricot pile fabric by napping the sinker loop (13) of pile yarn, the napped fluffs of the sinker loop (13) form cut piles by shearing the PPT-bulky textured multifilament yarn, called "bulky textured yarn" or "texturized yarn", is used for the ground yarn (11) the PPT-non-bulky textured multifilament yarn, called "non-bulky textured raw yarn" or "raw yarn", is used for the pile yarn (12), or alternatively, PPT-bulky textured multifilament yarn can be used for the pile yarn (12).

The vehicular upholstery PPT-fiber fabric of the present invention also has a PPT-core-in-sheath conjugate fiber multifilament yarn composed of core component-PET and sheath component-PPT whose amount in conjugate fiber is from about 65 to 75 (weight percent) and is used for at least the ground yarn (11) or the pile yarn (12).

The vehicular upholstery PPT-fiber fabric of the present invention also has PPT-non-bulky texturized multifilament yarn used for the ground yarn (11), and a PPT-bulky texturized multifilament twist yarn used for the pile yarn (12).

The vehicular upholstery PPT-fiber fabric of the present invention also has the single fiber fineness of the PPT-multifilament yarn at about 0.5~6.0 dtex, the total fineness of PPT-multifilament yarn at about 30~180 dtex, the density of the wale of the vehicular upholstery PPT-fiber fabric is at more than about 30 W/25.4 mm, the density of the course of the vehicular upholstery PPT-fiber fabric at more than about 50 C/25.4 mm the density of the knit loop, which is defined by the product of the density of the wale and the density of the course, at about from 1800 to 2300 C×W/(25.4 mm)$^2$, the basis weight of the vehicular upholstery PPT-fiber fabric at just about the weight of the raw fabric, at more than about 450 g/m$^2$, and the degree of curling in the knitting width direction and in the knitting length direction, respectively, at less than about 20.

In accordance with the present invention, a PPT-textured multi-filament yarn is used for the ground yarn (11). In this manner, when the PPT-fiber of the ground yarn (11) shrinks due to the potential stress stored in it, only the crimps disappear and the PPT-fiber is brought back to its original non-textured situation. Thus, the potential stress realized in the PPT-fiber is absorbed by the distortion from the modification of the textured situation to the non-bulky texturized situation of the PPT-fiber of the ground yarn (11).

On the other hand, most of the PPT-fiber of the pile yarn (12) has been cut, shortened and transformed to fluffs of cut pile. Thus, even though the potential stress has been stored in and realized in the PPT-fiber of the pile yarn (12), the potential stress is not so strong that the course intervals (L) become shortened. In this manner, even though the potential stresses have been stored in the ground yarn (11) and the pile yarn (12), curling hardly appears at the cut-off-end-portion.

It is not always necessary to form the ground yarn (11) and the pile yarn (12) by using only a PPT-fiber.

Also usable is a PPT-PET conjugate fiber composed of both a PPT-component and a PET-component, and is higher in Young's Modulus and lower in terms of the rate of elastic recovery, flexibility and stretching property in comparison to a PPT-fiber, and this PPT-PET conjugate fiber is preferably used not only for the ground yarn (11) but also for the pile yarn (12).

The application use of a PET-component reduces the potential stress during the weaving process. Thus, due to the effect of the PET-component, even if potential stresses stored in the ground yarn (11) or the pile yarn (12) are realized, curling hardly appears at the cut-off-end-portion. However, in comparison with pile yarn composed solely of PPT-fiber, the stretching property of the pile yarn composed of PPT-PET conjugate fiber is inferior. Therefore, when using PPT-PET conjugate fiber to make the pile yarn, the raking stress (P) which acts on the sinker loop of the pile yarn easily propagates to the needle loop during raising, and as a consequence the needle loop (14) of the pile yarn is easily pulled out by the raking stress (P), thus the course intervals (L) become shortened according to the amount of the parts of the needle loop (14) which are pulled out.

At the same time, since the ground yarn is not pulled out by the raking stress (P), looseness occurs in the ground yarn in accordance with the amount of the parts of the needle loop (14) pulled out by the raking stress (P).

Therefore, when the potential stress is realized in the ground yarn, the loosened portion of the ground yarn recovers only its original form and its original length.

As mentioned above, the curling at the cut-off-end-portion is not caused in the knitting length direction (W) by the raking stress (P) which arises from the potential stress and is realized in the ground yarn, since the raking stress (P) is absorbed into the looseness of the ground yarn.

A PPT-bulky texturized multifilament twist yarn is used for the pile yarn (12) which needs a powerful raking stress (P) to raise the twist yarn. In this manner, during the raising process, the raking stress (P) acts violently on the pile yarn as it is a twist yarn. The raking stress (P) is propagated to the needle loop of the pile yarn through the sinker loop (13) during raising. Then, the raking stress (P) acts as the tensile stress (Q) to pull the needle loop (14) out of the pile yarn. As a result, the course intervals (L) become shortened according to the amount of the parts of the needle loop (14) which are pulled out. Thus, the substantial length of the portion of the ground yarn of the needle loop becomes relatively longer than the substantial length of the portion of the pile yarn of the needle loop (14). Likewise, the ground yarn becomes loose in accordance with the parts of the ground yarn which are relatively elongated. Therefore, when the potential stress is realized in the ground yarn, the loosened portion of the ground yarn recovers only its original form and its original length. In this manner, the course intervals (L) shortened by the tensile stress (Q) which acts on the pile yarn during raising are not shortened further by the potential stress which is realized in the ground yarn after raising. Further, shrinking in the knitting length direction (W) of the napped tricot pile fabric is relieved. As a result, curling in the knitting length direction (W) hardly appears at the cut-off-end-portion of the vehicular upholstery PPT-fiber fabric, even if PPT-non-bulky texturized multifilament yarn (rather than PET yarn) has been used for the ground yarn (11).

As for the number of twists of the pile yarn, it may be less than 120 (times/m).

In the case of twisting of the pile yarn (12), the carding needle of the raising-roll does not separately scratch each fiber of the pile yarn (12), but instead scratches all fibers as one lot. However, it is more difficult to scratch all fibers as one lot, as opposed to scratching each fiber separately. Thus, it is difficult to raise the pile yarn (12). Accordingly, raising of twisted pile yarn (12) needs to be done via a powerful raking stress (P), and the needle loop (14) of the pile yarn has to be pulled violently. However, when the number of twists is great, it becomes difficult to raise the pile yarn (12). Accordingly, the number of twists of the pile yarn is less than about 120 (times/m).

Conventional napped tricot pile fabric used for a vehicular upholstery fabric is knitted by using PET-multifilament yarn whose single fiber fineness is about 0.5~6.0 dtex and whose total fineness is about 30~180 dtex, for the ground yarn (11) and the pile yarn (12). The sinker loop (13) of pile yarn of the raw tricot fabric is napped to form fluffs. The raw tricot fabric is transformed into a napped tricot pile fabric by shearing the napped fluffs to form cut piles. The density of the wale of a conventional napped tricot pile fabric is more than 30 W/25.4 mm. The density of the course of a conventional napped tricot pile fabric is more than about 50 C/25.4 mm. The density of the knit loop, defined by the product of the density of the wale of the cut pile and the density of the course of the cut pile of conventional napped tricot pile fabric is about 1800~2300 C×W/(25.4 mm)$^2$.

Therefore, the present invention obtains vehicular upholstery PPT-fiber fabric which does not curl at the cut-off-end-portion and thus is suitable for use in place of conventional vehicular upholstery fabric.

During the process of the configuration of the needle loop (14) that transforms the yarn into a puffed-loop shape strained in the knitting width direction (C), the napped tricot pile fabric does not receive strain in the knitting length direction (W). That is, the load to prevent the transforming in the knitting width direction (C) does not act in the knitting length direction (W). Therefore, the needle loop (14) hardly transforms into a lanky shape in the knitting length direction (W). Thus, the needle loop (14) hardly transforms into a puffed-loop shape which is puffed in the knitting width direction (C). Even though the potential stress which has been stored in PPT-fiber of the puffed-loop shape needle loop (14) which is puffed in the knitting width direction (C) is realized, the puffed-loop shape of the needle loop (14) transforms only into a lanky shape. Nonetheless, the course intervals (L) do not shorten.

Therefore, the present invention obtains vehicular upholstery PPT-fiber fabric which hardly curls in the knitting length direction (W). Further, as mentioned above, the present invention obtains vehicular upholstery PPT-fiber fabric which does not curl at the cut-off-end-portion during the cutting and sewing process and which can be efficiently processed into vehicular upholstery material. In this regard, the "basis weight of the vehicular upholstery PPT-fiber fabric" means that the density of the wale of the vehicular upholstery PPT-fiber fabric is equal to the density of the wale of raw tricot fabric. Further, "basis weight of the vehicular upholstery PPT-fiber fabric" also means that the density of the course of the vehicular upholstery PPT-fiber fabric is equal to the density of the course of the raw tricot fabric. Accordingly, in the present invention, "basis weight" means the weight of imaginary raw knitted fabric of which the density of the wale and the density of the course are respectively considered to be equal to the density of the wale and the density of the course of the vehicular upholstery PPT-fiber fabric which is processed into a finished good through raising, swelling, dyeing, and other treatments. Accordingly, in the present invention, the significance of "basis weight" is that it can be used as a means to presume the weight of the base knitted fabric which should remain after the pile is removed from the vehicular upholstery PPT-fiber fabric. The reason "basis weight" is a means to presume the weight of base knitted fabric includes the following:

(1) the degree of curling of the vehicular upholstery PPT-fiber fabric varies in accordance with the density of the bulk of fabric;
(2) the degree of curling can not be presumed by the fabric which remains when the pile is cut away from the vehicular upholstery PPT-fiber fabric;
(3) the pile is one portion of the pile yarn napped and projected from the base knitted fabric and, even though the pile is cut away during processing, a part of the pile remains among the base knitted fabric;
(4) as a result, it is difficult to know the juncture between the base knitted fabric and the part of the pile which remains after cutting;
(5) the degree of curling can not be presumed by the density of the bulk of the base knitted fabric;
(6) the weight of the vehicular upholstery PPT-fiber fabric varies in accordance with the amount of pile fibers removed during raising and the height of pile;
(7) the degree of curling can not be presumed by the weight of the vehicular upholstery PPT-fiber fabric;
(8) the weight of the base knitted fabric of the vehicular upholstery PPT-fiber fabric is in proportion to the weight of the raw tricot fabric,
(9) thus "basis weight" is used as a means to presume the weight of the base knitted fabric.

In the present invention, the degree of curling is measured by the following steps:
(1) a test piece of PPT-fiber fabric sized about 20 cm in the knitting length direction×20 cm in the knitting width direction is cut from the vehicular upholstery PPT-fiber fabric;
(2) the test piece is left untouched for 24 hours;
(3) the test piece is then spread neatly over a bottom metallic plate which is mounted on the surface of a horizontal table said metallic plate weighing about 180 g and sized about 22.5 cm in length×30 cm in width×1.0 mm in thickness;
(4) a similar top metallic plate weighing about 180 g and sized about 22.5 cm in length×30 cm in width×1.0 mm in thickness is placed on top of the test piece;
(5) a plummet weighing about 500 g is placed in the center of the top metallic plate and is left in place for 10 minutes;
(6) the plummet and top metallic plate are removed and the test piece is left untouched on the bottom plate for 10 minutes;
(7) the height from the surface of the bottom metallic plate to the edge portion of the test piece which may have curled up from the surface of the bottom metallic plate is then measured. This measuring procedure is carried out twice by directing the pile surface of the PPT-fabric test piece downward once, and by directing the pile surface of the PPT-fabric test piece upward once. The degree of curling is determined by maximum measured value, and is indicated in millimeters (mm). The measuring procedure is carried out under a temperature of about 20° C.×humidity 60%.

PPT-fiber is produced by polycondensation of terephthalic acid and diols such as 1-3-propandiol, 1-2-propandiol, 1-1-propandiol, 2-2-propandiol, and the like. PPT-fiber is also known as polytrimethyleneterephthalate fiber, abbreviated "PTT-fiber". One kind of PPT-fiber is made of petroleum.

However, in order to preserve natural resources of the global environment, it is desirable to use PPT-fiber made from plant fibers rather than from petroleum. It is especially desirable to use PPT-fiber made by polycondensation of 1-3-propandiol and terephthalic acid.

EXAMPLES

Seven examples of PPT-fiber raw tricot fabrics and one example of PET-fiber raw tricot fabric were respectively dyed and dried by heating. Subsequently, the sinker loop of pile yarn of these fabric were raised via a raising apparatus. Then, the raised fluffs of these fabrics were transformed into cut piles via a shearing apparatus. The finished thickness (total thickness) of these napped tricot pile fabrics were respectively about 1.8 mm. Subsequently, these napped tricot pile fabrics were strained in the knitting width direction (C) but without straining in the knitting length direction (W), and simultaneously heated at 150° C. via a heat setting apparatus. Five of the eight examples of the PPT-fiber napped tricot pile fabric are referred to as embodiments of the present invention. Two of the eight examples of the PPT-fiber napped tricot pile fabric are referred to as comparisons. The remaining one example of the eight examples can be referred to as conventional art. Table 1 summarizes the degree of curling, breaking strength, degree of softness and hardness, elastic recovery properties of the various piles, knitting textile design, the standard of finished fabric, the standard of ground yarn, the standard of pile yarn, and the measured value of the physical properties of these eight examples of napped tricot pile fabric.

In the present invention, the degree of softness and hardness of the PPT-fiber fabric is measured by the following steps in accordance with JIS-L-1018 (Japanese Industrial Standard L-1018):
(1) two fabric test pieces, one lanky in the knitting length direction and the other lanky in the knitting width direction are cut from the napped tricot pile fabric;
(2) the test pieces are placed on a flat and horizontal surface of a table with one end side portion having a sloping surface inclined at 45 degrees, thus creating a ridge where the flat surface of the table meets the sloping surface;
(3) one edge portion of one fabric test piece is positioned longitudinally at the ridgeline between the sloping surface and the flat and horizontal surface of table;
(4) the distance from the distal edge portion of said test piece to the ridgeline of the table is measured;
(5) the fabric test piece is then pushed out over the sloping surface side of the table to project the proximal edge portion of the test piece over the sloping surface;
(6) the pushing is stopped when the proximal edge portion of the fabric test piece which is projected over the sloping surface of the table hangs down and touches the sloping surface;
(7) total distance moved of the fabric test piece is then measured;
(8) the degree of softness and hardness of the napped tricot pile fabric is determined by the fabric test piece's total distance moved before its proximal side touched the sloping surface of the table;
(9) the degree of softness and hardness is indicated in "mm".
The elastic recovery property of the pile is measured by the following steps:
(1) a test piece is selected from the napped tricot pile fabric by cutting off a sample of arbitrary size, and this test piece is left under a loading of $0.5N/cm^2$ (50 $gf/cm^2$) for 2 hours in a thermostat tank at 80° C.;
(2) after loading, the test piece is removed from the thermostat tank and is observed;
(3) the elastic recovery property of the pile of a test piece on which collapsed piles or inclined piles are not observed at all is deemed to be "5-class";
(4) the elastic recovery property of the pile of a test piece on which inclined piles are slightly observed but hardly noticed is deemed to be "4-class";
(5) the elastic recovery property of the pile of a test piece on which inclined piles are observed but not significantly noticed is deemed to be "3-class";
(6) the elastic recovery property of the pile of a test piece on which collapsed piles or inclined piles are clearly observed is deemed to be "2-class";
(7) the elastic recovery property of the pile of a test piece on which fully collapsed piles or markedly inclined piles are observed is deemed to be "1-class".

As shown in Comparisons 1 and 2 of Table 1, for the napped tricot pile fabric in accordance with Embodiments 1, 2, 3 and 4 where the non-textured multifilament yarn is not used for the ground yarn, the potential stress stored in the ground yarn has turned into a shrinking stress and has been realized. In the case of Embodiments 1 and 2, the shrinking stress realized from the potential stress has caused distortion of ground yarn during the process of modification from textured yarn to non-textured yarn. In Embodiments 3 and 4 where a PPT-core-in-sheath core conjugate fiber multifilament yarn composed of a core component-PET and a sheath component-PPT whose conjugate fiber is 70 (weight percent) is used for the ground yarn (11) and the pile yarn (12), the shrinking stress caused by the sheath component-PPT is offset by the core component-PET and so the course intervals (L) are not shortened. Accordingly, the degree of curling of the napped tricot pile fabrics in Embodiments 1, 2, 3 and 4 is low.

The density of the knit loop of Comparisons 1 and 2, where the non-bulky-texturized multifilament yarn used for the ground yarn, is greater than the density of knit loop of the Embodiments 1, 2, 3 and 4.

Therefore, in the case of Comparisons 1 and 2, the potential stress stored in the ground yarn easily turns into a shrinking stress that shortens the course intervals (L) in the knitting length direction. Thus, the napped tricot pile fabric in Comparisons 1 and 2 tends to curl in the knitting length direction.

In the case of Embodiment 5, as well as Comparisons 1 and 2, non-textured multifilament yarn is used for the ground yarn.

However, the degree of curling in Embodiment 5 is lower than the degree of curling in Comparisons 1 and 2.

The reason is believed to be that the pile yarn used in Embodiment 5 is twisted, since it is difficult to raise the twisted pile yarn. Thus, in the case of raising the twisted pile yarn (12), a powerful raking stress (P) is needed as shown in FIG. 1. The strong raking stress (P) propagates from the sinker loop (13) to the needle loop (14). The strong raking stress (P) is transformed into the tensile stress (Q) to act on the needle loop (14) of the twisted pile yarn. Then, the twisted pile yarn of the needle loop (14) is pulled out and then the course intervals (L) becomes shortened. As a result, the substantial length of the portion of the ground yarn of the needle loop becomes relatively longer than the substantial length of the portion of the twisted pile yarn of the needle loop (14).

Consequently, the ground yarn (11) becomes loose and the looseness is reflected in the ground yarn (11) in accordance with the parts of the ground yarn which are elongated. Therefore, when the potential stress is realized in the fiber of ground yarn (11), the looseness is only removed from the fiber. Thus, even though the fiber shrinks, such shrinking of the fiber of the ground yarn (11) hardly shortens the course intervals (L).

On the other hand, if the ground yarn (11) of the needle loop (14) is brought into a loosened state, the napped tricot pile fabric becomes non-shrinkable in the knitting length direction (W). Therefore, curling hardly appears at the cut-off-end-portion of the napped tricot pile fabric when the pile yarn has been twisted.

FIG. 1 shows the raw tricot fabric which is indicated in Table 1.

The first reed ($L_1$) for the ground yarn or the second reed ($L_2$) for the ground yarn is knitted with a movement as follows:

. . . /1-2/1-0/1-2/1-0/1-2/1-0/ . . .

for formation of the knitted textile design. The first reed ($L_3$) for the pile yarn or the second reed ($L_4$) for the pile yarn is knitted with a movement as follows:

. . . /1-0/4-5/1-0/4-5/1-0/4-5/ . . .

for formation of the knitted textile design. Marks $W_1$, $W_2$, $W_3$, $W_4$, and $W_5$ indicate five wales where the sinker loop (13) is continuous.

In accordance with Embodiments 1, 2, 3, 4, and 5, it is encouraged for prevention of curling to set the specifications of the vehicular upholstery PPT-fiber fabric as follows:

(1) the PPT-textured multifilament yarn should be used for the ground yarn (Embodiments 1 and 2);

(2) the PPT-non-textured multifilament yarn or the PPT-textured multifilament yarn should be used for the pile yarn (Embodiments 1 and 2);

(3) preferably, the PPT-non-textured multifilament yarn should be used for the pile yarn (Embodiment 1);

(4) further, preferably the PPT-core-in-sheath core conjugate fiber multifilament yarn composed of the core component-PET and the sheath component-PPT whose conjugate fiber is from about 65 to 75 (weight percent) should be used for both the ground yarn and the pile yarn (Embodiments 3 and 4);

(5) in order to maintain the balance between the breaking strengths in the knitting length direction and the knitting width direction, the PPT-core-in-sheath core conjugate fiber multifilament yarn should be used for both the ground yarn and the pile yarn (Embodiments 3 and 4);

(6) if the PPT-non-textured multifilament yarn is used for the ground yarn, then the PPT-multifilament twist yarn should be used for the pile yarn (Embodiment 5).

(Table 1 follows on the next page.)

TABLE 1

| | | | Embodiment 1 | Embodiment 2 | Embodiment 3 | Embodiment 4 | Embodiment 5 | Comparison 1 | Comparison 2 | Conventional |
|---|---|---|---|---|---|---|---|---|---|---|
| knitting textile design | | the first Leed($L_1$) for ground yarn | 1-2/1-0 | 1-2/1-0 | 1-2/1-0 | 1-2/1-0 | 1-2/1-0 | 1-2/1-0 | 1-2/1-0 | 1-2/1-0 |
| | | the second Leed($L_2$) for ground yarn | 1-0/1-2 | 1-0/1-2 | 1-0/1-2 | 1-0/1-2 | 1-0/1-2 | 1-0/1-2 | 1-0/1-2 | 1-0/1-2 |
| | | the first Leed($L_3$) for pile yarn | 1-0/4-5 | 1-0/4-5 | 1-0/4-5 | 1-0/4-5 | 1-0/5-6 | 1-0/4-5 | 1-0/4-5 | 1-0/5-8 |
| | | the second Leed($L_4$) for pile yarn | 1-0/4-5 | 1-0/4-5 | 1-0/4-5 | 1-0/4-5 | . . . | 1-0/4-5 | 1-0/4-5 | 1-0/5-6 |
| Standard of manufactures | raw fabric | density of wale(W/25.4 mm) | 28 | 28 | 28 | 28 | 28 | 28 | 28 | 28 |
| | | density of course(C/25.4 mm) | 70 | 68 | 56 | 56 | 50 | 61 | 61 | 61 |
| | | basis weight (g/m²) | 520 | 544 | 377 | 386 | 384 | 404 | 395 | 388 |
| | | knitting width (cm) | 203 | 203 | 203 | 203 | 203 | 203 | 206 | 195 |
| | finished fabric | density of wale (W/25.4 mm) | 36 | 35 | 34 | 34 | 35 | 37 | 37 | 35 |
| | | density of course (C/25.4 mm) | 60 | 63 | 63 | 62 | 58 | 71 | 68 | 58 |
| | | density knit-loop(C × W) | 2160 | 2205 | 2142 | 2108 | 2030 | 2627 | 2516 | 2030 |
| | | finished weight (g/m²) | 383 | 412 | 466 | 482 | 519 | 599 | 509 | 405 |
| | | finished width (cm) | 156 | 163 | 167 | 167 | 154 | 150 | 156 | 156 |
| | | thickness (mm) | 2.10 | 1.80 | 1.65 | 1.80 | 1.80 | 1.80 | 2.00 | 2.00 |
| | | basis weight (g/m²) | 573 | 630 | 515 | 519 | 556 | 621 | 582 | 462 |
| Standard of ground yarn | PET-bulky texturiged multi f.y. | single fiber fineness(dtex) | . . . | . . . | . . . | . . . | . . . | . . . | . . . | 2.3 |
| | | total fineness (dtex) | . . . | . . . | . . . | . . . | . . . | . . . | . . . | 84 |
| | PPT non-bulky texturiged multi f.y. | single fiber fineness(dtex) | . . . | . . . | 2.3 | 1.75 | 2.3 | 2.3 | 3.5 | . . . |
| | | total fineness (dtex) | . . . | . . . | 84 | 84 | 84 | 84 | 84 | . . . |
| | | rate of core component(%) | . . . | . . . | PET 30% | PET 30% | . . . | . . . | . . . | . . . |
| | PPT-bulky texturiged multi f.y. | single fiber fineness(dtex) | 2.3 | 2.3 | . . . | . . . | . . . | . . . | . . . | . . . |
| | | total fineness (dtex) | 84 | 84 | . . . | . . . | . . . | . . . | . . . | . . . |
| Standard of pileyarn | PET-bulky texturiged multi f.y. | single fiber fineness(dtex) | . . . | . . . | . . . | . . . | . . . | . . . | . . . | 2.3 |
| | | total fineness (dtex) | . . . | . . . | . . . | . . . | . . . | . . . | . . . | 84 |
| | PPT non-bulky texturiged multi f.y. | single fiber fineness(dtex) | 1.75 | . . . | 2.3 | 1.75 | . . . | 1.75 | 3.5 | . . . |
| | | total fineness (dtex) | 84 | . . . | 84 | 84 | . . . | 84 | 84 | . . . |
| | | rate of core component(%) | . . . | . . . | PET 30% | PET 30% | . . . | . . . | . . . | . . . |
| | PPT-bulky texturiged multi-filament yarn | single fiber fineness(dtex) | . . . | 2.3 | . . . | 1.75 | 2.3 | 1.75 | . . . | . . . |
| | | total fineness (dtex) | . . . | 84 | . . . | 84 | 84 | 84 | . . . | . . . |
| | | number of the twist (T/m) | . . . | . . . | . . . | . . . | 90 | . . . | . . . | . . . |
| | | rate of core component(%) | . . . | . . . | . . . | PET 30% | . . . | . . . | . . . | . . . |
| Physical property | dgree of curling (mm) | in knitting length direction | 4 | 15 | 2 | 3 | 11 | 34 | 31 | 1 |
| | | in knitting width direction | 0 | 0 | 0 | 0 | 0 | 0 | 0 | 0 |
| | breaking strength (N/5 cm) | in knitting length direction | 128 | 119 | 90 | 98 | 119 | 124 | 128 | 182 |
| | | in knitting width direction | 70 | 78 | 82 | 82 | 78 | 88 | 82 | 113 |
| | degree of softness (mm) | in knitting length direction | 36 | 48 | 40 | 42 | 33 | 80 | 38 | 36 |
| | | in knitting width direction | 33 | 37 | 35 | 35 | 26 | 56 | 31 | 30 |
| | | elastic recovery property of pile(Class) | 2 | 3 | 2.5 | 3 | 3 | 2.5 | 2.5 | 3.5 |

The invention claimed is:

1. A vehicular upholstery polypropyleneterephthalate fiber fabric,
comprising:
a raw tricot fabric which is knitted by using polypropyleneterephthalate-multifilament yarn, for the ground yarn and the pile yarn;
wherein the raw tricot fabric is transformed into a napped tricot pile fabric by raising the sinker loop of the pile yarn of the raw tricot fabric to form fluffs which are then sheared to form cut piles;
a polypropyleneterephthalate-textured multifilament yarn is used for the ground yarn; and
a polypropyleneterephthalate-non-textured multifilament yarn or a polypropyleneterephthalate-bulky textured multifilament yarn is used for the pile.

2. A vehicular upholstery polypropyleneterephthalate fiber fabric,
comprising:
a vehicular upholstery fabric is made from a raw tricot fabric which is knitted by using polypropyleneterephthalate-multifilament yarn for the ground yarn and the pile yarn;
wherein the raw tricot fabric is transformed into a napped tricot pile fabric by raising the sinker loop of the pile yarn of the raw tricot fabric to form fluffs which are then sheared to form cut piles; and
a polypropyleneterephthalate-core-in-sheath core conjugate fiber multifilament yarn composed of a core component-polyethyleneterephthalate and a sheath component-polypropyleneterephthalate whose conjugate fiber is from 65 to 75 (weight percent) is used for at least the ground yarn or the pile yarn.

3. A vehicular upholstery polypropyleneterephthalate fiber fabric,
comprising:
a raw tricot fabric which is knitted by using polypropyleneterephthalate-multifilament yarn, for the ground yarn and the pile yarn;
wherein the raw tricot fabric is transformed into a napped tricot pile fabric by raising the sinker loop of the pile yarn of the raw tricot fabric to form fluffs which are then sheared to form cut piles;
a polypropyleneterephthalate-non-textured multifilament yarn is used for the ground yarn; and
a polypropyleneterephthalate-textured multifilament twist yarn is used for the pile yarn.

4. A vehicular upholstery polypropyleneterephthalate fiber fabric according to claim 1, wherein:
the single fiber fineness of the polypropyleneterephthalate-multifilament yarn is 0.5~6.0 dtex;
the total finess of polypropyleneterephthalate-multifilament yarn is 30~180 dtex;
the density of the wale of the vehicular upholstery polypropyleneterephthalate-fiber fabric is more than 30 W/25.4 mm;
the density of the course of the vehicular upholstery polypropyleneterephthalate-fiber fabric is more than 50 C/25.4 mm;
the density of the knit loop, which is defined by the product of the density of the wale and the density of the course, is 1800 to 2300 C×W/(25.4 mm)$^2$;
the basis weight of the vehicular upholstery polypropyleneterephthalate-fiber fabric has been set at more than 450 g/m$^2$; and
the degree of curling in the knitting width direction and in the knitting length direction are respectively less than 20.

5. A method for the production of vehicular upholstery fabric comprising the following steps:
knitting a raw tricot fabric by using a polypropyleneterephthalate-multifilament yarn, whose single fiber fineness is 0.5~6.0 dtex and whose total fineness is 30~180 dtex for the ground yarn and the pile yarn;
napping the sinker loop of the pile yarn of the raw tricot fabric to form fluffs;
transforming the raw tricot fabric into a napped tricot pile fabric by shearing the napped fluffs to form cut piles;
neatly spreading the napped tricot pile fabric;
heating the spreaded napped tricot pile fabric by straining in the knitting width direction but without straining in the knitting length direction, thus relieving a potential stress of the needle loop of the ground yarn stored during the knitting process;
heating the napped tricot pile fabric by the same straining process such that the density of the wale of the cut pile is more than 30 W/25.4 mm, the density of the course of the cut pile is more than 50 C/25.4 mm, and the density of the knit loop, which is defined by the product of the density of the wale of the cut pile and the density of the course of the cut pile, is from 1800 to 2300 C×W/(25.4 mm)$^2$.

6. A vehicular upholstery polypropyleneterephthalate fiber fabric according to claim 2, wherein:
the single fiber fineness of the polypropyleneterephthalate-multifilament yarn is 0.5~6.0 dtex;
the total finess of polypropyleneterephthalate-multifilament yarn is 30~180 dtex;
the density of the wale of the vehicular upholstery polypropyleneterephthalate-fiber fabric is more than 30 W/25.4 mm;
the density of the course of the vehicular upholstery polypropyleneterephthalate-fiber fabric is more than 50 C/25.4 mm;
the density of the knit loop, which is defined by the product of the density of the wale and the density of the course, is 1800 to 2300 C×W/(25.4 mm)$^2$;
the basis weight of the vehicular upholstery polypropyleneterephthalate-fiber fabric has been set at more than 450 g/m$^2$; and
the degree of curling in the knitting width direction and in the knitting length direction are respectively less than 20.

7. A vehicular upholstery polypropyleneterephthalate fiber fabric according to claim 3, wherein:
the single fiber fineness of the polypropyleneterephthalate-multifilament yarn is 0.5~6.0 dtex;
the total finess of polypropyleneterephthalate-multifilament yarn is 30~180 dtex;
the density of the wale of the vehicular upholstery polypropyleneterephthalate-fiber fabric is more than 30 W/25.4 mm;
the density of the course of the vehicular upholstery polypropyleneterephthalate-fiber fabric is more than 50 C/25.4 mm;
the density of the knit loop, which is defined by the product of the density of the wale and the density of the course, is 1800 to 2300 C×W/(25.4 mm)$^2$;
the basis weight of the vehicular upholstery polypropyleneterephthalate-fiber fabric has been set at more than 450 g/m$^2$; and
the degree of curling in the knitting width direction and in the knitting length direction are respectively less than 20.

* * * * *